(12) United States Patent
Hughes et al.

(10) Patent No.: US 9,544,846 B2
(45) Date of Patent: Jan. 10, 2017

(54) METHOD AND APPARATUS FOR BLUETOOTH-BASED GENERAL SERVICE DISCOVERY

(71) Applicant: Intel IP Corporation, Santa Clara, CA (US)

(72) Inventors: Robert D. Hughes, Tualatin, OR (US); Carlos Cordeiro, Portland, OR (US); Emily H. Qi, Camas, WA (US); Po-Kai Huang, Santa Clara, CA (US); David J. McCall, Dallas, TX (US); Robert Stacey, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/089,493

(22) Filed: Apr. 2, 2016

(65) Prior Publication Data
US 2016/0219507 A1    Jul. 28, 2016

Related U.S. Application Data

(63) Continuation of application No. 14/319,822, filed on Jun. 30, 2014.

(60) Provisional application No. 61/988,827, filed on May 5, 2014.

(51) Int. Cl.
| | | |
|---|---|---|
| *H04W 8/00* | (2009.01) | |
| *H04W 52/02* | (2009.01) | |
| *H04W 48/16* | (2009.01) | |
| *H04W 4/00* | (2009.01) | |
| *H04W 48/10* | (2009.01) | |
| *H04W 84/12* | (2009.01) | |
| *H04W 88/06* | (2009.01) | |

(52) U.S. Cl.
CPC ......... *H04W 52/0209* (2013.01); *H04W 4/008* (2013.01); *H04W 8/005* (2013.01); *H04W 48/10* (2013.01); *H04W 48/16* (2013.01); *H04W 52/02* (2013.01); *H04W 52/0229* (2013.01); *H04W 84/12* (2013.01); *H04W 88/06* (2013.01)

(58) Field of Classification Search
CPC ....... H04W 4/008; H04W 88/06; H04W 8/005
See application file for complete search history.

(56) References Cited

U.S. PATENT DOCUMENTS

| | | | | |
|---|---|---|---|---|
| 9,008,917 | B2 * | 4/2015 | Gautama ............... | B60W 10/30 455/41.2 |
| 2011/0021142 | A1 * | 1/2011 | Desai .................... | H04W 8/005 455/41.2 |
| 2011/0295695 | A1 * | 12/2011 | Ishihara ............. | G06Q 30/0269 705/14.66 |
| 2013/0201915 | A1 * | 8/2013 | Wang ................... | H04W 24/10 370/328 |

(Continued)

*Primary Examiner* — David Bilodeau (57) ABSTRACT

The disclosure relates to a method, system and apparatus for extending Bluetooth low energy (BLE) technology to conserve energy in multi-mode wireless devices. In one embodiment, the disclosure relates to a device comprising a first module configured for radio communication at a non-BLE communication mode; a second module to communicate at a BLE communication mode; and a controller for controlling the first and the second communication modules, the controller configured to direct the BLE communication mode to at least one of advertise or scan for information relating to the non-BLE communication mode.

36 Claims, 7 Drawing Sheets

| Service Data AD Type (2 bytes) | Bluetooth SIG D2D Service Discovery Service UUID (2 bytes) | SDO / SIG Identifier (1 byte) | Available for SDO/SIG Use (up to 22 bytes) | Optional Additional AD Types |
|---|---|---|---|---|
| 210 | 212 | 214 | 216 | 218 |

(56) References Cited

U.S. PATENT DOCUMENTS

| | | | | |
|---|---|---|---|---|
| 2014/0357192 A1* | 12/2014 | Azogui | ............... | H04B 7/26 |
| | | | | 455/41.2 |
| 2014/0378058 A1* | 12/2014 | Decuir | ............... | H04W 4/008 |
| | | | | 455/41.2 |
| 2015/0099467 A1* | 4/2015 | Kang | ............... | H04W 8/005 |
| | | | | 455/41.2 |
| 2015/0109897 A1* | 4/2015 | Lee | ............... | H04W 48/10 |
| | | | | 370/216 |
| 2015/0264514 A1* | 9/2015 | Qi | ............... | H04W 4/008 |
| | | | | 370/338 |

* cited by examiner

METHOD AND APPARATUS FOR BLUETOOTH-BASED GENERAL SERVICE DISCOVERY

CROSS-REFERENCE TO RELATED APPLICATIONS

The instant application is a continuation of, claims the benefit of and priority to previously filed U.S. patent application Ser. No. 14/319,822, filed Jun. 30, 2014, entitled "METHOD AND APPARATUS FOR BLUETOOTH-BASED GENERAL SERVICE DISCOVERY", which claims the benefit of U.S. Provisional Patent Application Ser. No. 61/988,827, filed May 5, 2014; the subject matter of both of the above are incorporated herein in by reference in their entirety.

BACKGROUND

Field

The disclosure relates to a method, apparatus and system for Bluetooth-based general service discovery. Specifically, the disclosure relates to a method, system and apparatus for extending Bluetooth low energy technology to conserve energy in multi-mode wireless devices.

Description of Related Art

Bluetooth low energy (BLE) technology provides connectivity between Bluetooth (BT) mobile devices and a variety of BT systems, including, cars, exercise devices, computers, tablets and the like. The BLE technology supports relatively low power consumption of the mobile device. For example, a BT mobile device may be a small sensor, a watch, or a Smartphone having a battery with limited power supply and the BLE technology may enable the BT mobile device to communicate with the variety of systems using a relatively low power consumption.

In all wireless devices an initial discovery process is used to identify networks and other devices capable of wireless communication. For example, a Wi-Fi network device may regularly transmit beacon signals which can be picked up and identified by other Wi-Fi devices enabling them to discover and join the Wi-Fi network.

Similarly, BLE devices continually transmit and scan for BLE advertising message in order to establish connectivity. For example, a first BT device (the BLE central device) and a second BT device (BLE peripheral device) may discover each other and establish a connection to enable data exchange. Compared to the conventional communication modes, BLE provides considerably reduced power consumption and lower cost while searching and discovering corresponding BLE devices.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Certain embodiments may be used in conjunction with various devices and systems, for example, a mobile phone, a smartphone, a laptop computer, a sensor device, a BT device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12—TGac Channel Model Addendum Document"); IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec., 2012)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

In one embodiment, the disclosure provides power efficiency in multi-mode communication environments. Conventional wireless devices include multiple wireless technologies with each technology capable of supporting multiple services (e.g., printing, file transfer, remote display, connection assist, etc.) Examples of other wireless technologies includes IEEE 802.11a, IEEE 802.11b, IEEE 802.11g, IEEE 802.11n, IEEE 802.11ac, IEEE 802.11ad (WiGig), Wi-Fi Direct, Wi-Di, LTE, LTE-Direct and ZigBee. While some wireless technologies have mature and may have low power service discovery mechanisms, many do not. BLE has simple and mature service discovery features which is ubiquitous in phones, tablets and mobile computing platforms.

BLE has a growing number of applications. Because BLE has low power consumption, it can be engaged continually without rapidly draining device battery. An increasing number of devices include BLE and other wireless technologies on the same platform.

In one embodiment of the disclosure, a BLE radio is used to discover other BLE devices and/or services (i.e., other device capabilities and/or needs). In another embodiment, the BLE radio is used to discover other (non-BLE) wireless platforms and services. Using the BLE service discovery for other wireless communication modes residing on the same platform results in significant power saving.

The BLE communication mode may comprise a connectionless communication mode. The non-BLE communication mode may comprise a connection-oriented communication mode. The connectionless and connection-oriented communication modes may be engaged simultaneously for a communication duration. Alternatively, the device may engage these modes sequentially. In another embodiment, the connectionless communication mode is used for general device discovery. Once a device corresponding to the desired attributes (needs and/or capabilities) is discovered, then the connection-oriented platform establishes communication with the corresponding device.

In an exemplary embodiment, a platform that supports a BLE device and non-BLE device may use its general BLE device discovery for the non-BLE services. If the seeking platform (i.e., the scanning device) finds a corresponding device with a compatible need and/or capability, then the devices can connect over a common radio and perform the necessary functions. The common radio may be a non-BLE radio. Since BLE is ubiquitous and likely to be always-on, the disclosed embodiments allow the other radios to be turned off or operate in lower power mode.

In another embodiment, a BLE central device comprises built-in features enabling it to: (1) scan for BLE peripheral devices with certain needs and/or capabilities; and (2) advertise the BLE central device's own needs and/or capabilities. The needs and/or capabilities may include other wireless applications sharing the same platform as the BLE central device. These application may include Wi-Fi, Wi-Gig, Cellular or any other non-BT application (herein, secondary communication modes or secondary radios). Because of its ubiquity, low power requirement and service discovery capabilities, BLE may be used to discover services (capabilities and/or needs) for use over non-BLE radios. Using BLE allows the secondary radios to remain off or in a low-power consumption or standby.

Figure 1:
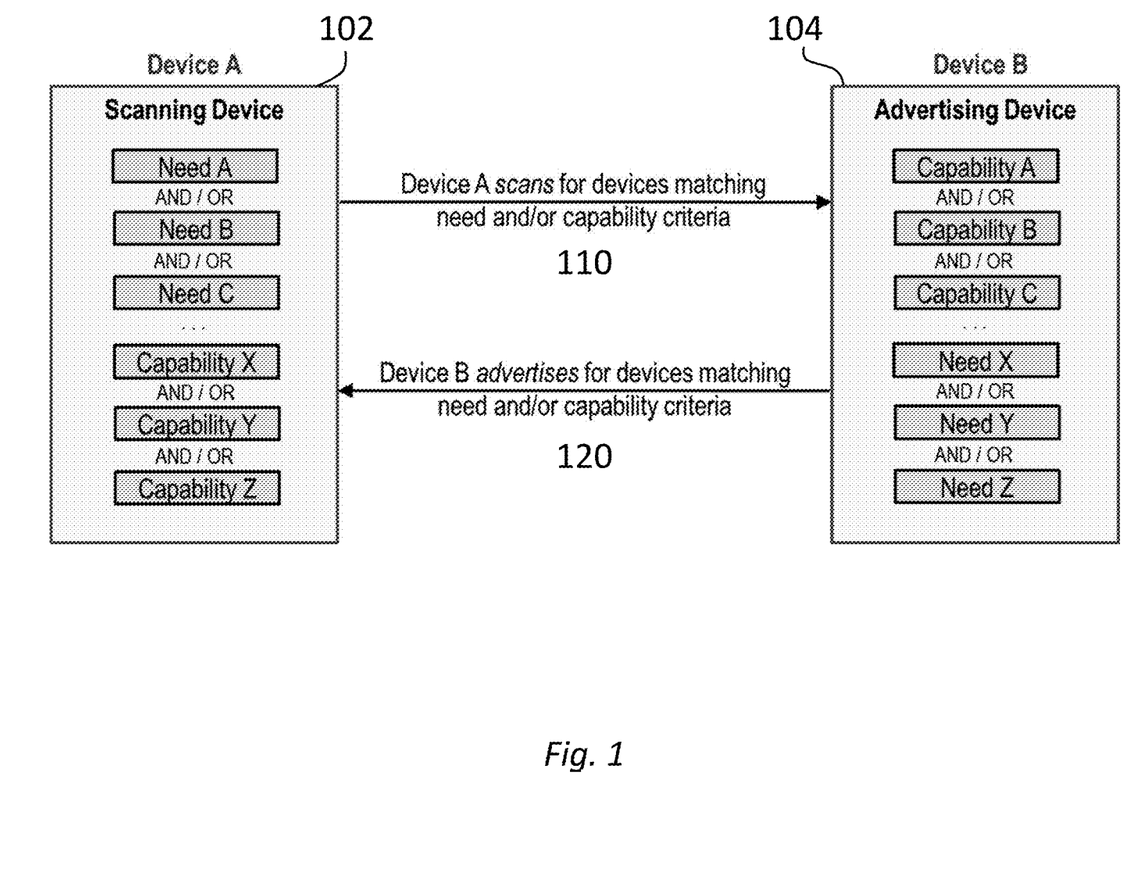
FIG. 1 is a schematic representation of device scanning and advertising process.

FIG. 1 is a schematic representation of device scanning and advertising process. Specifically, FIG. 1 illustrates how devices may advertise their capabilities and/or needs as supported by non-Bluetooth radios. FIG. 1 also shows how devices may scan to look for available services/devices that have compatible capabilities and/or needs. At FIG. 1, device 102 scans for devices matching its needs and/or capabilities as represented by arrow 110. Devices 102 and 104 may be dedicated scanners or advertisers. Alternatively, the devices may switch between scanning and advertising modes.

Device 102 (Device A) is shown as having needs A, B and C, as well as capabilities X, Y and Z. Scanning may include broadcasting a signal (e.g., beacon signal) in one or more communication modes (e.g., Wi-Fi, cellular, BT, etc.). In one embodiment, scanning includes listening for advertisement from other devices. Capabilities may include, ability to connect on Wi-Fi or to communicate with the internet backbone. Exemplary needs include: printing, docketing and data sharing (for example, from a camera that has photos to share), projecting, etc.)

At step 120 Device 104 (Device B) responds by advertising for devices having matching needs and/or capabilities. Specifically, advertising Device B may send a beacon signal advertising capabilities A, B and C, as well as needs X, Y and Z. Scanning and advertising devices may transmit different signals (pursuant to different protocols) to advertise or scan for each need and/or capability. For example, if device 102 is scanning for a Wi-Fi need, a Wi-Fi signal may be issued by the Wi-Fi radio on the scanning device. In one embodiment, the scanning device may not issue a Wi-Fi signal until a compatible device is found.

In another embodiment of the disclosure, the advertising and/or scanning functions are implemented through the BLE platform of the advertising and/or scanning device. That is, in a device having multiple radio platforms, the advertising and/or scanning from non-BLE platforms can be conveyed through the BLE radio, using BLE protocols. One or more controllers may be configured to identify needs/capabilities from the non-BLE platforms (or BLE-Platforms supporting a non-BLE radio), convey the relevant needs/capabilities through the BLE transmitter and communicate any information received from a corresponding platform to the appropriate non-BLE platforms. In another embodiment, the non-BLE platforms are at sleep or on standby mode during this time so as to reduce power consumption. The non-BLE information is transmitted using one or more non-BLE (or BLE) packets according to the disclosed embodiments.

In still another embodiment, the disclosure provides a generic framework and mechanism that may be used by a variety of wireless technologies operated by different BT special interest groups (SIGs) and standard developing organizations (SDOs). The contents of the attributes in the framework (referred to as characteristics and descriptors) may be defined by SIDs/SDOs.

Figure 2:
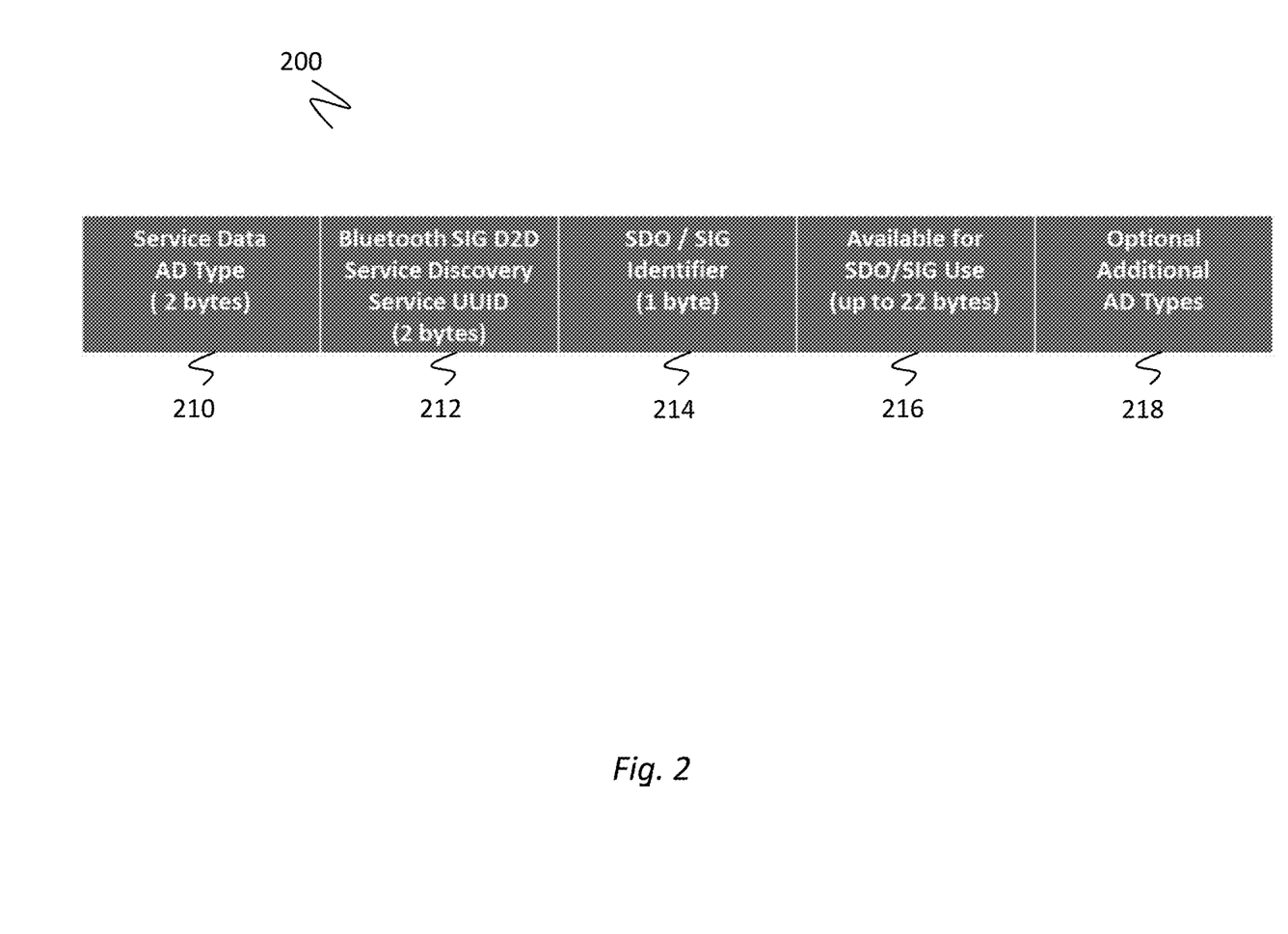
FIG. 2 shows an exemplary advertising packet according to one embodiment of the disclosure.

FIG. 2 shows an exemplary advertising packet according to one embodiment of the disclosure. The exemplary packet 200 of FIG. 2 has a 27 octet payload. A larger or smaller payload may be used without departing from the disclosed principles. Packet 200 comprises service data type 210, BT service discovery 212, SDO/SIG identifier 214, available bytes 216 and optional additional service data AD types 218.

In packet 200, the first two octets 210 can be used as a field within the Advertising Packet for Service-specific data. In an exemplary embodiment, these two bytes identify that the advertising data is for service-specific data. The next two bytes may identify which service (i.e., the device-to-device (D2D) discovery service) is identified.

The second two octets 212, provide a 16-bit universally unique identifier (UUID) to identify this service as the D2D Discovery Service. Next, octet 216 provides a single octet identifier such that the contents of the packet will be known or to be defined by the specific SDO/SIG (e.g., 0x01=WiFi Alliance, 0x02=3GPP . . . ) Octet 216 (up to 22 bytes) may be defined by the coordinating SDO/SIG. At octet 218 (depending on availability) additional Advertising Data Types as defined in the Bluetooth Core Specification can be inserted. Again, packet 200 is exemplary and other options for packet content and payload definition may be used without departing from the disclosed principles.

In yet another embodiment, the disclosure provides a similar packet structure for the Scan Response (ScanResponse) Packet if more data related to services or connection setup through an additional radio is shared. The Advertising Packet and Scan Response Packet can be shared without the need to connect to the remote device.

If a compatible device is discovered, the contents of the Advertising Packet (and optionally the Scan Response Packet) may be sufficient and a connection may be formed through the non-BLE radio. In some embodiments, however, a BLE connection may be required to obtain additional information for the non-BLE connections.

An embodiment of the disclosure provides a generic mechanism (e.g., packet structure or database) that can be used by different SDOs/SIGs to define packet content within the framework suitable for their respective needs. By way of example, the Wi-Fi Alliance (WFA) may define the necessary contents of a characteristic and the number of descriptors in the hierarchy associated with that characteristic as well as the characteristic and descriptor contents. In one embodiment, the database is configured to support multiple SDOs/SIGs and may be scalable and/or extensible.

Figure 3:
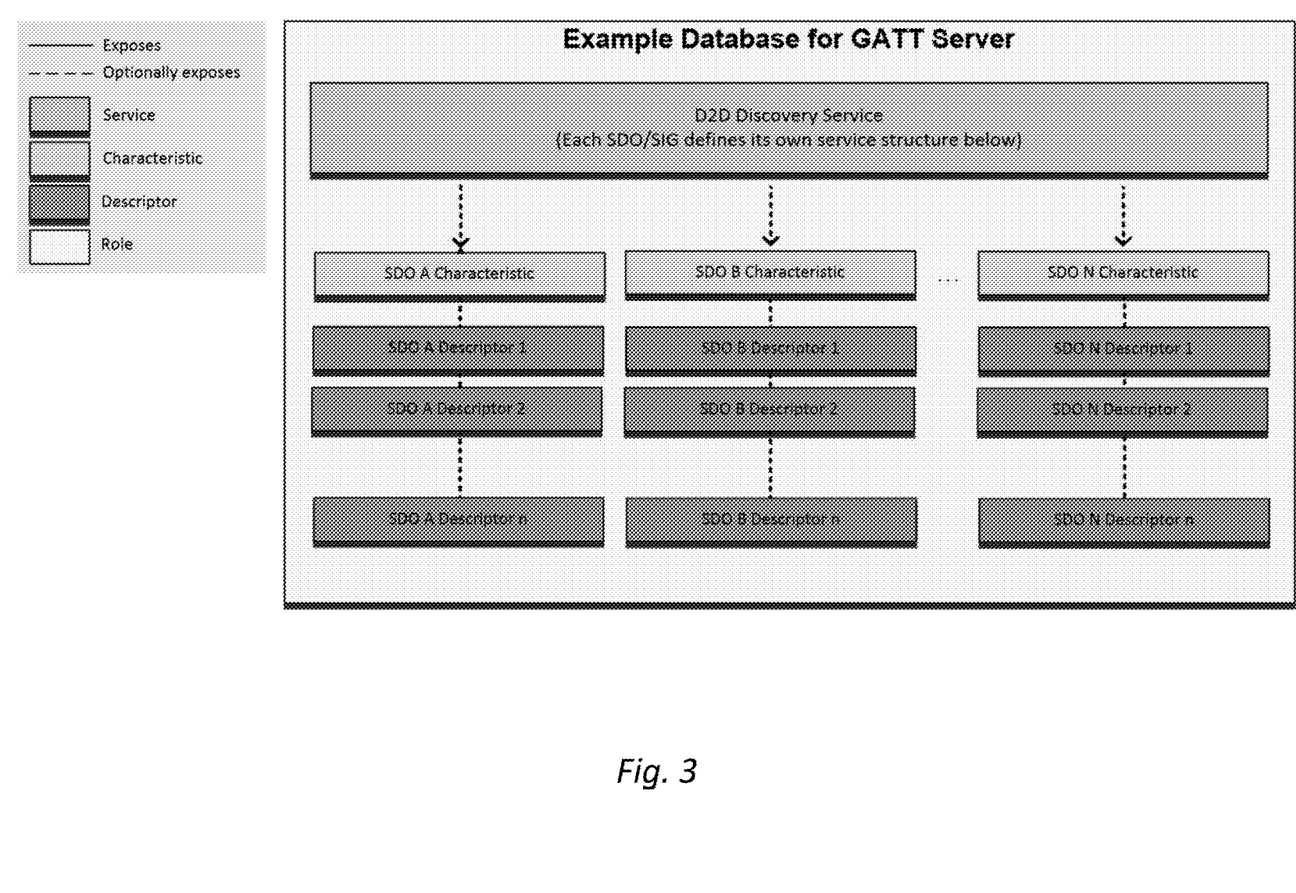
FIG. 3 shows a sample database for an exemplary D2D discovery service according to one embodiment of the disclosure.

FIG. 3 shows a sample database for an exemplary D2D discovery service according to one embodiment of the disclosure. The database shown in FIG. 3 can be used once the devices are connected. The database of FIG. 3 may be stored at the Generic Attribute Profile (GATT) server. GATT is built on top of the Attribute Protocol (ATT) and establishes common operations and framework for data transported and stored by the Attribute Protocol. GATT defines two roles: server and client. The GATT roles may be specified by higher layer profiles.

Referring to FIG. 3, the D2D database may include characteristic information for devices A, B . . . N. The characteristic information field may include pertinent descriptors, for example, SDO descriptors 1 . . . n. The fields of the database may be modified to accommodate the non-BLE platforms. It should be noted that the database is exemplary and there may be several characteristics assigned to each SIG/SDO.

Figure 4A:
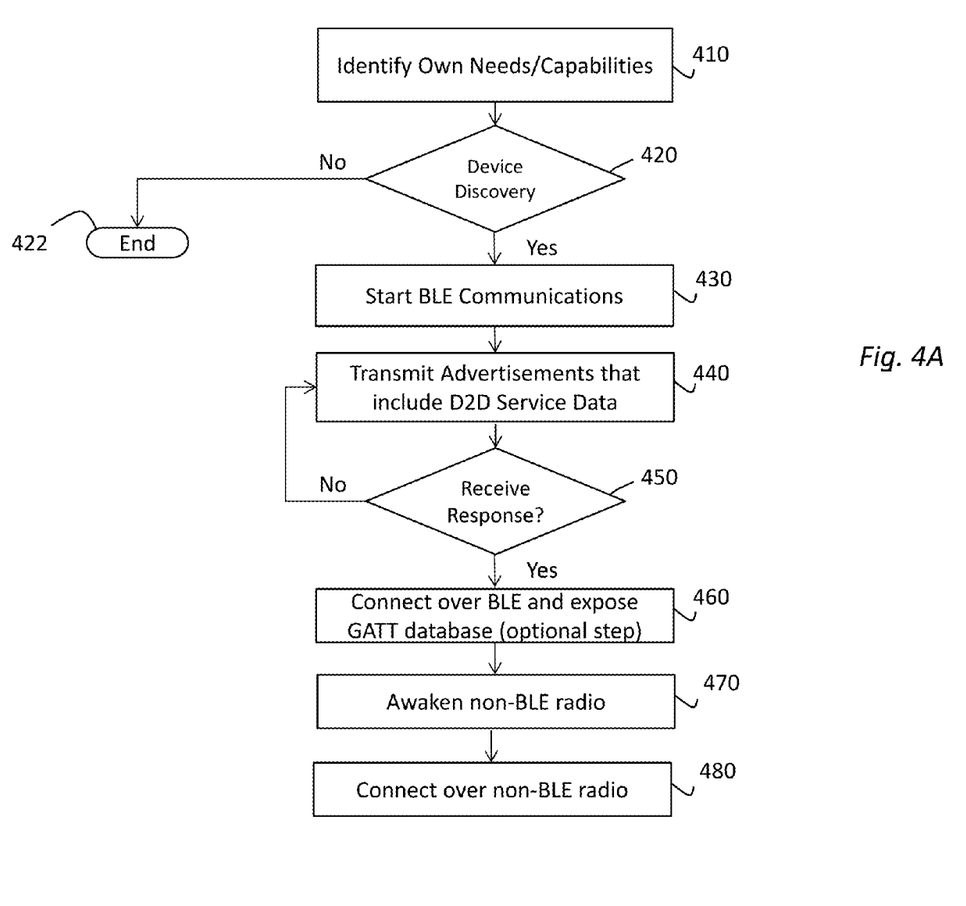
FIG. 4A is a flow diagram of an exemplary process for advertising for needs and/or capabilities according to one embodiment of the disclosure.

FIG. 4A is a flow diagram of an exemplary process for advertising for needs and/or capabilities according to one embodiment of the disclosure. At step 410, the initiating device (Device A) identifies its own needs and/or capabilities. At step 420, the initiating device looks for a device that also has a non-BLE radio by conducting device discovery. Step 420 can be done by advertising an (e.g., broadcasting appropriate signal). If such device is not found through advertising, then the process ends at steps 422. If such device is found, then at step 430, a BLE communication is started between the corresponding devices. At step 440, the initiating device transmits advertisement(s) that include D2D service data. If no response is received, the process of step 440 is repeated (see step 450). If response is received, at step 460, the corresponding devices connect over BLE and expose GATT database or exchange other pertinent information. Step 460 may be optional. At step 470, the initiating—and optionally, the corresponding—device awakens the non-BLE radio on the platform. At step 480, the corresponding devices connect over the non-BLE radios. The information obtained during the BLE session may be used to connect over the non-BLE radios.

Figure 4B:
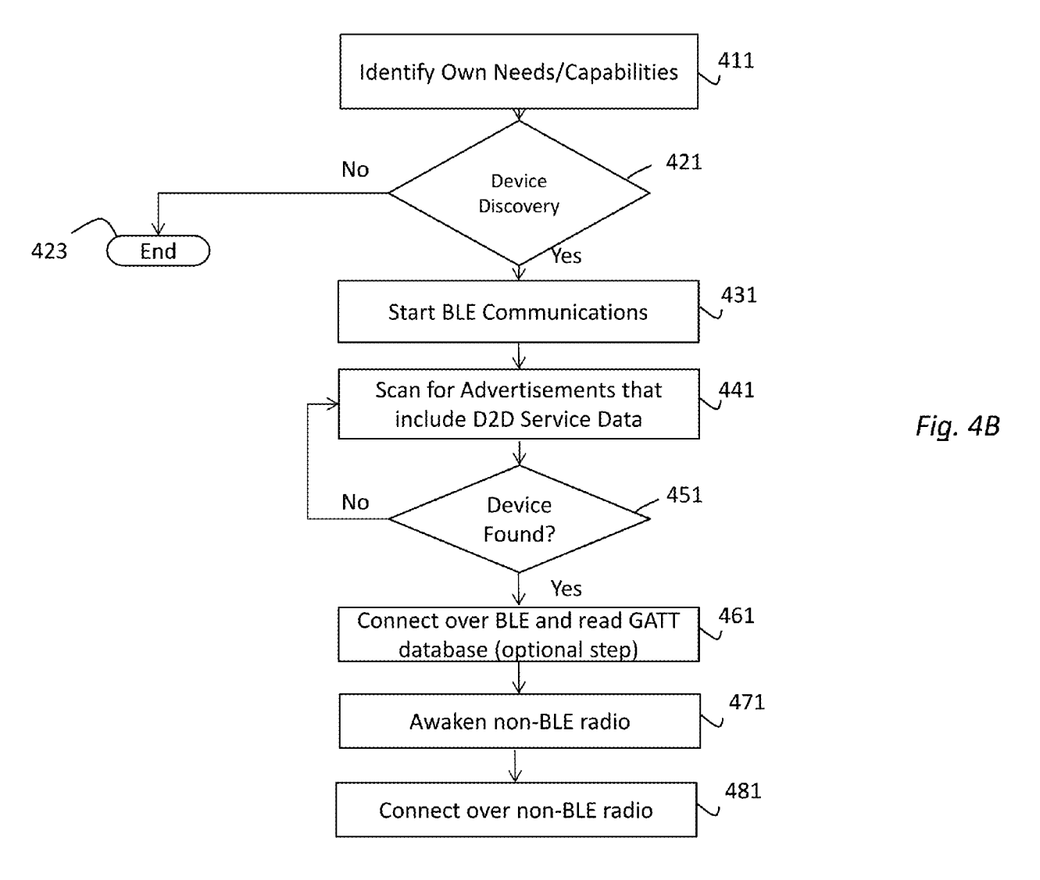
FIG. 4B is a flow diagram of an exemplary process for scanning for needs and/or capabilities according to one embodiment of the disclosure.

FIG. 4B is a flow diagram of an exemplary process for scanning for needs and/or capabilities according to one embodiment of the disclosure. At step 411, the initiating device (Device A) identifies its own needs and/or capabilities. At step 421, the initiating device looks for a device that also has non-BLE radio by conducting device discovery. This step can be done by scanning for available signals (e.g., broadcasted beacons or other signals). If such device is not found, then the process ends at step 423. If such device is found, then at step 431, BLE communication is started between the corresponding devices. At step 441, the initiating device transmits advertisements that include D2D service data. If no response is received, the process of step 441 is repeated (see step 451). If response is received, at step 461, the corresponding devices connect over BLE and expose GATT database or exchange other pertinent information. Step 461 may be optional. At step 471, the initiating—and optionally, the corresponding—device awaken the non-BLE radio on the platform. At step 481, the corresponding devices connect over the non-BLE radios. The information obtained during the BLE session may be used to connect over the non-BLE radios.

The flow diagrams of FIGS. 4A and 4B may be executed on a device having multiple wireless platforms, including BLE and non-BLE platforms. The process of FIGS. 4A and 4B may be implemented by software or hardware or a combination thereof. In an exemplary embodiment, the process is implemented by an application residing on the device hardware. In another example, the process is hard-coded into a chipset or is programmed into an existing integrated circuit (IC). Each of the corresponding devices may include an application providing similar functionality. The application may communicate with the BT or the BLE processor and/or radio such that the application is readily accessible.

Figure 5:
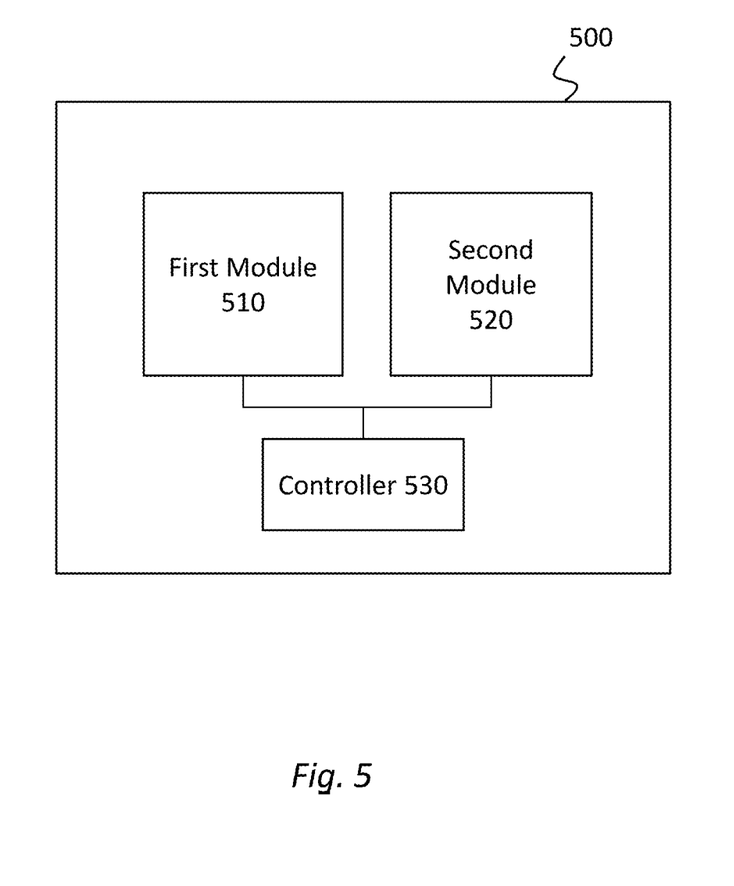
FIG. 5 is an exemplary apparatus for implementing an embodiment of the disclosure.

FIG. 5 is an exemplary apparatus for implementing an embodiment of the disclosure. The system of FIG. 5 can be an integral part of a larger system or can be a stand-alone unit. For example, device 500 may define a system-on-chip (SOC) configured to implement the disclosed methods. Device 500 may also be part of a larger system having one or more antennas, one or more radios and one or more processors and memory systems. Device 500 may define a software or an app which can be configured into an existing controller to enable the disclosed functionalities.

Device 500 is shown with first module 510 and second module 520. First module 510 may define a primary communication mode, for example, Wi-Fi. Module 510 may further comprise a Wi-Fi radio, Wi-Fi antenna, circuitry and software and/or firmware required for Wi-Fi communication. Module 520 may define a secondary communication mode, for example, BT or BLE. Module 520 may further comprise a BT/BLE radio, BT/BLE antenna, circuitry and software and/or firmware required for BT/BLE communication. Additionally, modules 510 and 520 may comprise controller module 530 to enable communication and execution between the modules. In an exemplary embodiment, first module 510 comprises processor circuitry (not shown) to implement the primary communication mode and second module 520 comprises processor circuitry (not shown) to implement the secondary communication mode.

Device 500 may establish communication with a corresponding device in the primary mode utilizing first module 510. By way of example, the primary communication may be Wi-Fi. Upon establishing the primary communication or simultaneously therewith, a secondary communication mode (e.g., BLE) may be established through second module 520. Controller module 530 may coordinate synchronization between the corresponding wireless platforms residing on the device. In one embodiment, controller module 530 identifies an attribute (i.e., need and/or capability) of the non-BLE platform by interrogating the platform. The controller may then communicate the attribute through the second module using BLE communication protocol. The communication may include both advertising the attributes or scanning the BLE channels for devices corresponding to the identified attributes. Once controller module 530 identifies a corresponding deice commensurate with the desired attribute, the controller may communicate the corresponding device to the first communication module.

Controller module 530 may also engage the corresponding devices in BLE communication, for example, to scan for matching devices or to advertise for devices matching the identified attribute. The controller module may inactivate the non-BLE portions of apparatus 500 to conserve energy. The inactive portions of apparatus 500 may be activated on as-needed basis or after the appropriate corresponding device has been identified.

Figure 6:
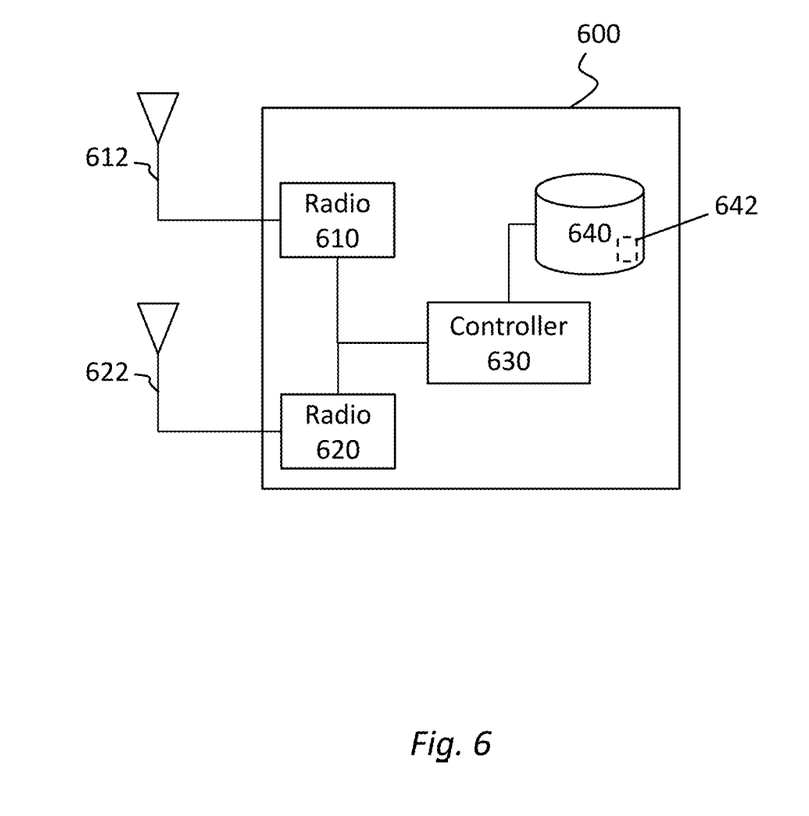
FIG. 6 is an exemplary system for implementing one or more of the disclosed embodiments.

FIG. 6 is an exemplary system for implementing one or more of the disclosed embodiments. For example, the steps of any of the above-disclosed flow diagrams may be implemented at the system of FIG. 6. System 600 of FIG. 6 may define a mobile device such as a smartphone, a tablet or any device capable of wireless communication. System 600 may include BLE and non-BLE platforms as shown.

Antenna 612 communicates with radio 610. Radio 610 and antenna 612 may be configured for the primary communication mode (e.g., Wi-Fi). Antenna 622 is configured to communicate with radio 620. Radio 620 and antenna 622 may be configured for BT/BLE communication. While system 600 is shown with two antennas and two radios, the disclosure is not limited thereto. Additional antennas can be added to system 600 such that different signals for different protocols can be received at different antennas. Radios 610 and 620 may include transceiver components such as front-end receiver components or a receiver/transmitter. Further, different radios may share the same antenna without departing from the disclosed principles.

Controller 630 is configured to communicate with both radios 610 and 620. Controller 630 may also direct communication between radios 610 and 630. For example, if BLE communication mode is less energy intensive, controller 630 may direct radio 620 to communicate using the BLE protocol. During such communications, controller 630 may place the remaining radio and antenna to sleep so as to reduce device energy consumption. Controller 630 may awaken the other radio and antenna during regular intervals (e.g., every few minutes) or on as-needed bases, for example, to transfer large data quantities.

Controller 630 also communicates with memory circuit 640. In one embodiment, memory circuit 640 and controller 630 define interconnected hardware controlled by software. In another embodiment, memory circuit 640 and controller 630 defines an integrated firmware. Memory circuit 640 may comprise special instructions 642 to direct controller 630 to implement one or more of the processes described herein. For example, instructions 642 may direct controller 630 to: (1) establish BLE communication through radio 610 (and antenna 612) with a corresponding device; (2) determine whether the corresponding device can accommodate the secondary communication means, and if so; (3) transmit appropriate packets scanning for device matching need and/or capability criteria; (4) advertise for devices matching need and/or capability criteria; (5) receive response packets; (6) awaken non-BLE platforms to engage in non-BLE communication.

In another embodiment of the disclosure, controller 630 utilizes the secondary communication mode to communicate additional information (i.e., information not directed to the primary mode synchronization). This information may include information that would be otherwise transmitted through the primary mode at a higher energy consumption rate.

In an exemplary embodiment, the processor may comprise an operating system (OS) running on the host computer or, if all radios are within the same system-on-chip (SOC), the background synchronization can be confined to within the SoC and without involving the host computer. The controller can perform these functions without awakening the host or it may awaken the host to assist in the process.

In the OS embodiment of the disclosure, multiple standalone communications modes can be governed by a software. Here, each standalone radio has a unique Media Access Control (MAC) address or unique network interface card (NIC). The software (or app) extracts the information from the BLE packet and direct the information to each NIC to synchronize accordingly. The OS may use direct memory access (DMA) to convey information to each standalone radio. In this embodiment, the OS is not directly communicating with each radio. Rather, a DMA controller addresses each standalone communication mode. The OS merely configures the DMA with appropriate instruction information.

In the SOC embodiment of the disclosure, an integrated chipset or radio is used for two or more communication modes. For example, the same SOC may control both the BLE and Wi-Fi communication modes. Other, non-BLE radios may optionally be included. The BLE and Wi-Fi modes may have a shared antenna or each may have its own antenna. The SOC may include an integrated processor configured to receive the BLE data packet. Appropriate information for Wi-Fi use are extracted and used accordingly. In one embodiment, a shared memory may be used for different communication modes. The information can be written in the shared memory and each communication mode can then read the appropriate information. Alternatively, a shared bus can be used and the wireless radios may communicate directly over the bus.

The following examples pertain to further embodiments of the disclosure. Example 1 relates to a communication system, comprising: a BLE platform to communicate with a BLE radio; a non-BLE platform to communicate with a non-BLE radio; and a controller to communicate with the BLE platform and with the non-BLE platform, the controller configured to: (a) identify an attribute of the non-BLE platform; (b) communicate the attribute through a BLE communication channel; (c) identify a corresponding device commensurate with the identified attribute; and (d) communicate the corresponding device to the non-BLE platform.

Example 2 is directed to the communication system of example 1, wherein the controller is further configured to establish a non-BLE communication with the corresponding device.

Example 3 is directed to the communication system of example 1, wherein the controller is further configured to maintain a simultaneous BLE communication and a non-BLE communication with the corresponding device.

Example 4 is directed to the communication system of example 1, wherein the controller is further configured to maintain the non-BLE platform at sleep mode during steps (a)-(c).

Example 5 is directed to the communication system of example 1, wherein the attribute defines at least one of a need or a capability of the non-BLE platform.

Example 6 is directed to the communication system of example 1, wherein the controller is further configured to communicate the identified attribute by one of transmitting a BLE advertisement or by scanning for a BLE advertisement.

Example 7 is directed to the communication system of example 1, wherein the controller is further configured to identify a corresponding deice by invoking a BLE proximity detection protocol.

Example 8 is directed to a system-on-chip device, comprising: a first processor module to execute a BLE communication mode; a second processor module to execute a non-BLE communication mode; and a controller to communicate with the first and the second processor modules, the controller configured to communicate an attribute of the non-BLE communication mode through the first module, identify a corresponding device commensurate with the attribute through the second module and communicate the corresponding device to the first module.

Example 9 is directed to the system-on-chip device of example 8, wherein the controller is further configured to establish a non-BLE communication with the corresponding device.

Example 10 is directed to the system-on-chip device of example 8, wherein the controller is further configured to maintain a simultaneous BLE communication and a non-BLE communication with the corresponding device.

Example 11 is directed to the system-on-chip device of example 8, wherein the controller is further configured to awaken the first processor module to communicate the corresponding device.

Example 12 is directed to the system-on-chip device of example 8, wherein the attribute defines at least one of a need or a capability of the first processor module.

Example 13 is directed to the system-on-chip device of example 8, wherein the controller is further configured to communicate the attribute by one of transmitting a BLE advertisement or by scanning for a BLE advertisement.

Example 14 is directed to the system-on-chip device of example 8, wherein the controller is further configured to identify a corresponding deice by invoking a BLE proximity detection protocol through the first processor module.

Example 15 is directed to a connectionless method for device service discovery, comprising: identifying, at a processor, an attribute of a connection-oriented platform associated with a device; communicating the identified attribute through a connectionless communication channel associated with the device; identifying a corresponding device commensurate with the identified attribute; and communicating the identified corresponding device to the connection-oriented platform.

Example 16 is directed to the method of example 15, wherein the connection-oriented platform comprises a non-BLE communication mode and the connectionless communication channel comprises a BLE communication channel.

Example 17 is directed to the method of example 15, further comprising establishing communication with the corresponding device through the connection-oriented platform.

Example 18 is directed to the method of example 15, further comprising maintaining simultaneous connectionless and connection-oriented communication with the corresponding device.

Example 19 is directed to the method of example 15, further comprising awakening the connection-oriented platform prior to communicating the identified corresponding device.

Example 20 is directed to the method of example 15, wherein the attribute defines at least one of a need or a capability of the connection-oriented platform.

Example 21 is directed to the non-transitory computer-readable storage device having a set of instructions to cause a processor to perform a process comprising: identify an attribute of a connection-oriented platform associated with the device; communicate the identified attribute through a connectionless communication channel associated with the device; identify a corresponding device commensurate with the identified attribute; and communicate the identified corresponding device to the connection-oriented platform.

Example 22 is directed to the compute computer-readable storage device of example 21, wherein the connection-oriented platform comprises a non-BLE communication mode and the connectionless communication channel comprise a BLE communication channel.

Example 23 is directed to the computer-readable storage device of example 21, wherein the instructions further cause the processor establish a communication with the corresponding device through the connection-oriented platform.

Example 24 is directed to the computer-readable storage device of example 21, wherein the instructions further cause the processor to maintain simultaneous connectionless and connection-oriented communication with the corresponding device.

Example 25 is directed to the computer-readable storage device of example 21, wherein the instructions further cause the processor to awaken the connection-oriented platform prior to communicating the identified corresponding device.

While the principles of the disclosure have been illustrated in relation to the exemplary embodiments shown herein, the principles of the disclosure are not limited thereto and include any modification, variation or permutation thereof.

What is claimed is:

1. An apparatus, comprising: a memory;
circuitry for Bluetooth Low Energy (BLE) communication, at least a portion of the circuitry coupled to the memory, the circuitry to:
generate a packet for transmission over a BLE channel from a wireless communication device, the packet to comprise advertising data for a service associated with a non-Bluetooth wireless communication technology, the advertising data to indicate whether the wireless communication device is a seeking platform, the advertising data to comprise an identifier for an organization associated with the non-Bluetooth wireless communication technology;

identify a remote device based on a response to the packet, the response received from the remote device, the remote device to comprise a device capable of wireless communication according to the non-Bluetooth wireless communication technology; and cause the wireless communication device to engage in wireless communication with the remote device according to the non-Bluetooth wireless communication technology.

2. The apparatus of claim 1, the advertising data to indicate whether the wireless communication device is capable of providing the service.

3. The apparatus of claim 1, the non-Bluetooth wireless communication technology to comprise a Wi-Fi Alliance wireless communication technology.

4. The apparatus of claim 1, the non-Bluetooth wireless communication technology to comprise a cellular wireless communication technology.

5. The apparatus of claim 1, the circuitry to cause the wireless communication device to operate as a Generic Attribute Profile (GATT) server.

6. The apparatus of claim 5, the circuitry to cause the wireless communication device to expose a GATT database to the remote device, the GATT database to comprise data associated with the non-Bluetooth wireless communication technology, the remote device to comprise a GATT client.

7. The apparatus of claim 1, the wireless communication device to comprise a BLE peripheral device.

8. The apparatus of claim 1, the remote device to comprise a BLE central device.

9. A system-on-a-chip (SoC), comprising:
the apparatus of claim 1;
a first radio for BLE communication, the first radio coupled to the circuitry; and
a second radio for wireless communication according to the non-Bluetooth wireless communication technology.

10. A system, comprising:
the SoC of claim 9;
a first antenna coupled to the first radio; and
a second antenna coupled to the second radio.

11. At least one non-transitory machine-readable storage medium, comprising a set of instructions that, in response to being executed at a wireless communication device, cause the wireless communication device to:
transmit a packet over a Bluetooth Low Energy (BLE) advertising channel, the packet to comprise advertising data for a service associated with a non-Bluetooth wireless communication technology, the advertising data to indicate whether the wireless communication device is a seeking platform, the advertising data to comprise an identifier for an organization associated with the non-Bluetooth wireless communication technology;
identify a remote device based on a response to the packet, the response received from the remote device, the remote device to comprise a device capable of wireless communication according to the non-Bluetooth wireless communication technology; and
wirelessly communicate with the remote device according to the non-Bluetooth wireless communication technology.

12. The at least one non-transitory machine-readable storage medium of claim 11, the advertising data to indicate whether the wireless communication device is capable of providing the service.

13. The at least one non-transitory machine-readable storage medium of claim 11, the non-Bluetooth wireless communication technology to comprise a Wi-Fi Alliance wireless communication technology.

14. The at least one non-transitory machine-readable storage medium of claim 11, the non-Bluetooth wireless communication technology to comprise a cellular wireless communication technology.

15. The at least one non-transitory machine-readable storage medium of claim 11, comprising instructions that, in response to being executed at the wireless communication device, cause the wireless communication device to operate as a Generic Attribute Profile (GATT) server.

16. The at least one non-transitory machine-readable storage medium of claim 15, comprising instructions that, in response to being executed at the wireless communication device, cause the wireless communication device to expose a GATT database to the remote device, the GATT database to comprise data associated with the non-Bluetooth wireless communication technology, the remote device to comprise a GATT client.

17. The at least one non-transitory machine-readable storage medium of claim 11, the wireless communication device to comprise a BLE peripheral device.

18. The at least one non-transitory machine-readable storage medium of claim 11, the remote device to comprise a BLE central device.

19. An apparatus, comprising:
a memory;
circuitry for Bluetooth Low Energy (BLE) communication, at least a portion of the circuitry coupled to the memory, the circuitry to:
scan a BLE channel for advertising packets;
identify a remote device based on a packet received from the remote device over the BLE channel, the packet to comprise advertising data for a service associated with a non-Bluetooth wireless communication technology, the advertising data to indicate whether the remote device is a seeking platform, the advertising data to comprise an identifier for an organization associated with the non-Bluetooth wireless communication technology;
generate a response for transmission from a wireless communication device to the remote device to initiate an establishment of a BLE connection with the remote device; and
cause the wireless communication device to engage in wireless communication with the remote device according to the non-Bluetooth wireless communication technology.

20. The apparatus of claim 19, the advertising data to indicate whether the remote device is capable of providing the service.

21. The apparatus of claim 19, the non-Bluetooth wireless communication technology to comprise a Wi-Fi Alliance wireless communication technology.

22. The apparatus of claim 19, the non-Bluetooth wireless communication technology to comprise a cellular wireless communication technology.

23. The apparatus of claim 19, the circuitry to cause the wireless communication device to operate as a Generic Attribute Profile (GATT) client.

24. The apparatus of claim 23, the circuitry to cause the wireless communication device to access data comprised in an exposed GATT database of the remote device, the GATT database to comprise data associated with the non-Bluetooth wireless communication technology, the remote device to comprise a GATT server.

25. The apparatus of claim 19, the wireless communication device to comprise a BLE central device.

26. The apparatus of claim 19, the remote device to comprise a BLE peripheral device.

27. A system, comprising:
the apparatus of claim 19;
a first radio for BLE communication, the first radio coupled to the circuitry; and
a second radio for wireless communication according to the non-Bluetooth wireless communication technology.

28. The system of claim 27, comprising:
a first antenna coupled to the first radio; and
a second antenna coupled to the second radio.

29. At least one non-transitory machine-readable storage medium, comprising a set of instructions that, in response to being executed at a wireless communication device, cause the wireless communication device to:
scan a BLE channel for advertising packets;
identify a remote device based on a packet received from the remote device over the BLE channel, the packet to comprise advertising data for a service associated with a non-Bluetooth wireless communication technology, the advertising data to indicate whether the remote device is a seeking platform, the advertising data to comprise an identifier for an organization associated with the non-Bluetooth wireless communication technology;
transmit a response to the remote device to initiate an establishment of a BLE connection with the remote device; and
wirelessly communicate with the remote device according to the non-Bluetooth wireless communication technology.

30. The at least one non-transitory machine-readable storage medium of claim 29, the advertising data to indicate whether the remote device is capable of providing the service.

31. The at least one non-transitory machine-readable storage medium of claim 29, the non-Bluetooth wireless communication technology to comprise a Wi-Fi Alliance wireless communication technology.

32. The at least one non-transitory machine-readable storage medium of claim 29, the non-Bluetooth wireless communication technology to comprise a cellular wireless communication technology.

33. The at least one non-transitory machine-readable storage medium of claim 29, comprising instructions that, in response to being executed at the wireless communication device, cause the wireless communication device to cause the wireless communication device to operate as a Generic Attribute Profile (GATT) client.

34. The at least one non-transitory machine-readable storage medium of claim 33, comprising instructions that, in response to being executed at the wireless communication device, cause the wireless communication device to access data comprised in an exposed GATT database of the remote device, the GATT database to comprise data associated with the non-Bluetooth wireless communication technology, the remote device to comprise a GATT server.

35. The at least one non-transitory machine-readable storage medium of claim 29, the wireless communication device to comprise a BLE central device.

36. The at least one non-transitory machine-readable storage medium of claim 29, the remote device to comprise a BLE peripheral device.

* * * * *